United States Patent
Stein et al.

(10) Patent No.: US 6,229,306 B1
(45) Date of Patent: May 8, 2001

(54) METHOD AND APPARATUS FOR MEASURING MAGNETIC PROPERTIES OF SHEET MATERIAL WITH BOTH LOW AND HIGH MAGNETIC PARTICLE DENSITY

(75) Inventors: Dieter Stein, Holzkirchen; Lothar Schütt, Dachau, both of (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/011,747
(22) PCT Filed: Jun. 23, 1997
(86) PCT No.: PCT/EP97/03280
§ 371 Date: Jun. 18, 1998
§ 102(e) Date: Jun. 18, 1998
(87) PCT Pub. No.: WO97/50061
PCT Pub. Date: Dec. 31, 1997

(30) Foreign Application Priority Data

Jun. 24, 1996 (DE) .............................. 196 25 224

(51) Int. Cl.$^7$ ............................ G07D 7/00; G01N 27/72; G01R 33/12
(52) U.S. Cl. ........................ 324/243; 324/225; 324/202; 235/449; 194/213
(58) Field of Search .................... 324/202, 225, 324/226, 239, 243; 235/449, 450, 493; 194/210, 213, 320; 209/562, 563, 567, 569, 570

(56) References Cited

U.S. PATENT DOCUMENTS 3,920,960 * 11/1975 Ditman .

* cited by examiner

Primary Examiner—Walter E. Snow
(74) Attorney, Agent, or Firm—Bacon & Thomas, PLLC (57) ABSTRACT

The method for measuring magnetic properties of sheet material is able to deliver reliable signals at both low and high magnetic particle density in the sheet material. First a measuring head converts the magnetic properties of the sheet material into electric signals. The electric signals produced by the measuring head are amplified in a certain signal range such that the lower-amplitude electric signals produced by the areas with low magnetic particle density of the sheet material are amplified to a greater extent than the electric higher-amplitude signals produced by the areas with high magnetic particle density of the sheet material. For this purpose the signal range is divided into at least three ranges which are each amplified constantly. The amplification in the two outer ranges is selected equal, and the amplification in the middle range greater than the amplification in the outer ranges. The electric signal is preferably shifted by a constant value before amplification so that the zero point of the signal range is in the middle of the middle range.

21 Claims, 8 Drawing Sheets

METHOD AND APPARATUS FOR MEASURING MAGNETIC PROPERTIES OF SHEET MATERIAL WITH BOTH LOW AND HIGH MAGNETIC PARTICLE DENSITY

BACKGROUND OF THE INVENTION

1. Field of the Invention

This invention relates to a method and an apparatus for measuring magnetic properties of sheet material such as bank notes.

2. Description of Related Art

Such an apparatus is known from DE 40 22 739. The apparatus has at least one measuring head with at least two pole shoes disposed so as to form a measuring gap. The magnetic signals produced by the magnetic properties of the sheet material at the measuring gap are converted into electric signals by a detector on at least one of the pole shoes.

In order to permit in particular magnetic particles with low remanence to be detected with sufficient reliability, one pole shoe is made of permanent-magnetic material and the other pole shoe of soft magnetic material. The magnetic field produced by the material of the permanent-magnetic pole shoe is selected to be so great that the soft magnetic material of the other pole shoe has a suitable magnetic operating point. This measure permits even low magnetic signals at the measuring gap to produce sufficient electric signals on the detector.

In particular bank notes generally have low magnetic particle densities in the area of the printed image and high ones e.g. in the area of the security thread, so that electric signals with low or high amplitudes arise on the detector during measurement of bank notes.

SUMMARY OF THE INVENTION

The problem of the invention is to propose a method for measuring magnetic properties of sheet material which delivers reliable signals at both low and high magnetic particle density.

The basic idea of the invention is substantially to amplify the electric signals produced by the detector of a measuring head in a certain signal range such that the lower-amplitude electric signals produced by the areas with low magnetic particle density are amplified to a greater extent than the higher-amplitude electric signals produced by the areas with high magnetic particle density. For this purpose the signal range is divided into at least two signal ranges which are each amplified constantly. The amplification in the range for lower-amplitude signals is greater than in the adjoining signal range.

The signal range is preferably divided into at least three ranges which are each amplified constantly. The amplification in the two outer ranges is selected to be equal, and the amplification in the middle range is selected to be greater than the amplification in the outer ranges. The electric signal is preferably shifted by a constant value before amplification so that the zero point of the signal range is in the middle of the middle range.

One advantage of the method is that the low-amplitude electric signals produced by the areas with low particle density are located in the middle range of the signal range and amplified to a great extent, while the high-amplitude electric signals produced by the areas with high particle density fall within the two outer ranges of the signal range and are amplified to a lesser extent than the low-amplitude electric signals. The amplitudes of the electric signals at the amplifier output are therefore distributed more uniformly over the output range of the amplifier and can then be optimally processed by a following analog-to-digital converter for example. Suitable shift of the electric signal from the detector permits amplification of both positive and negative amplitudes.

In an apparatus for carrying out the method for measuring magnetic properties of sheet material one can use for example a measuring head known from DE 40 22 739 for converting the magnetic properties of the sheet material into electric signals.

A preferred embodiment of an apparatus for carrying out the method has at least one measuring head with at least two pole shoes which are decoupled magnetically, each having a detector and preferably soft magnetic material. Further, means are provided for producing a time-invariant magnetic field perpendicular to the detector plane, the strength of the magnetic field being different on each detector. The strength of the time-invariant magnetic field is preferably selected so that the soft magnetic material of one pole shoe has a suitable magnetic operating point.

One advantage of the preferred embodiment is that the asymmetrically constructed measuring head causes the signals produced by the detectors and amplified to have different symmetries depending on whether soft magnetic particles with low remanence or hard magnetic particles with high remanence are measured. This permits differentiation of whether the measurement involves particles with low or high remanence.

In a further embodiment, means are provided in the measuring gap of the measuring head for producing a defined, time-variant, magnetic signal. One preferably provides an electric conductor through which a defined, time-variant, electric signal is conducted.

Using the electric signal measured at the amplifier output one can for example vary the amplification of the amplifier such that the electric signals measured at the amplifier output are adapted to a certain value. Alternatively, one can obtain an adaptation of the electric signals measured at the amplifier output to a certain value by suitably normalizing the electric signals. This procedure permits elimination of undesirable variations in amplification which arise e.g. from temperature influence or from wear of the measuring head.

Disposing a plurality of measuring heads in an array permits a plurality of tracks of the sheet material to be measured simultaneously.

DETAILED DESCRIPTION OF THE PREFERRED EMBODIMENT

Figure 1A:
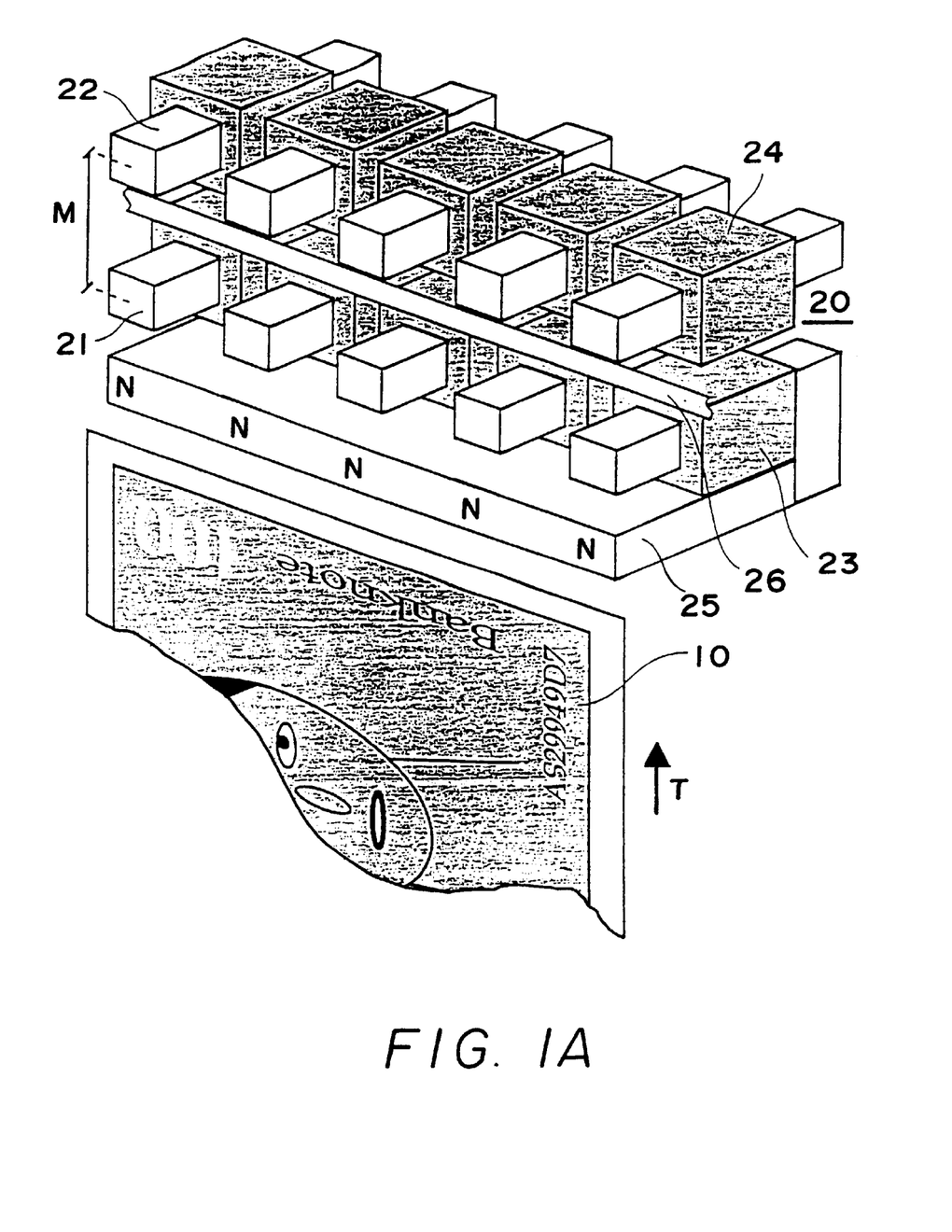
FIGS. 1a, 1b and 1c show schematic diagrams of the preferred embodiment of the invention.
Figure 1B:
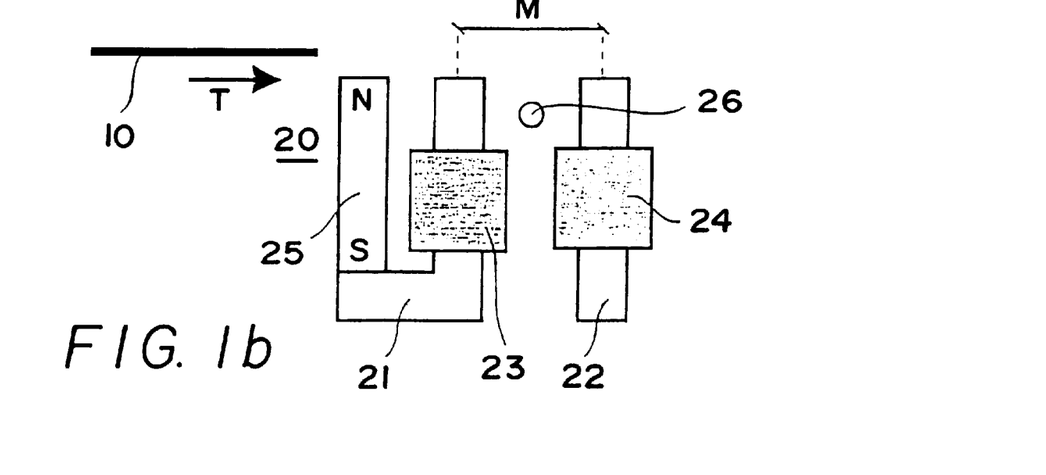
Figure 1C:
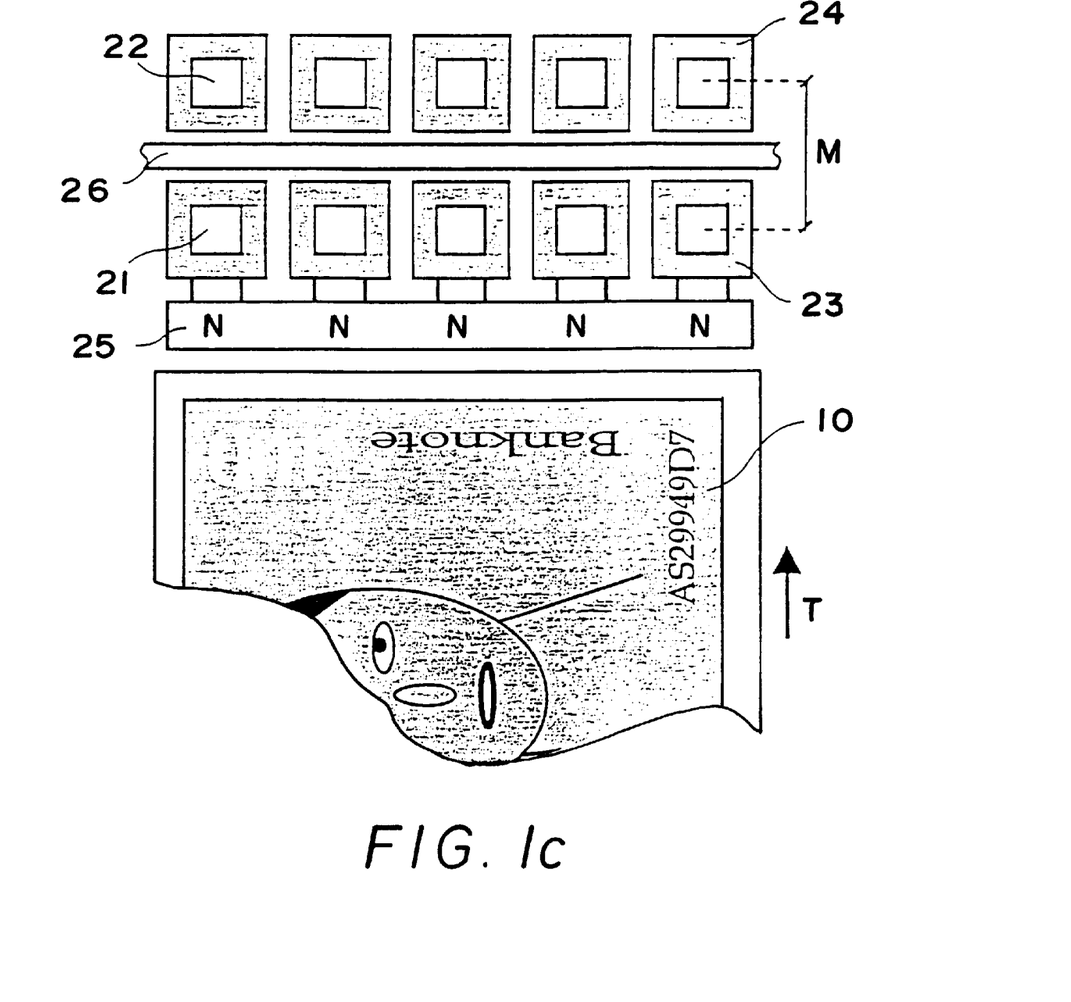

FIG. 1 shows a schematic diagram of the preferred embodiment of the invention. Sheet material 10 and a plurality of measuring heads 20 disposed as an array are shown in a perspective view in FIG. 1*a,* in a side view in FIG. 1*b,* and in a plan view in FIG. 1*c.*

Each measuring head 20 has two pole shoes 21 and 22 which are decoupled magnetically and which each have a respective detector 23, 24. Suitable detectors 23 and 24 are for example coils, Hall probes or magnetically sensitive resistors. Permanent magnet 25 is provided for producing a time-invariant magnetic field. To obtain good interaction between permanent magnet 25 and pole shoe 21 the two are directly interconnected so that the magnetic field produced by permanent magnet 25 can readily penetrate the material of pole shoe 21.

Pole shoes 21 and 22 preferably have soft magnetic material. The strength of the magnetic field of permanent magnet 25 is selected so that the soft magnetic material of pole shoe 21 has a suitable magnetic operating point.

The magnetic decoupling of pole shoes 21 and 22 causes the magnetic field of permanent magnet 25 to be much lower in pole shoe 22 than in pole shoe 21, so that pole shoe 22 has no suitable magnetic operating point. In order to increase this effect one can additionally provide a screen (not shown here) about pole shoe 22 so that the strength of the magnetic field of permanent magnet 25 is as low as possible in pole shoe 22.

Pole shoes 21 and 22 are disposed so as to form measuring gap M and transfer magnetic signals at the measuring gap perpendicular to the detector plane of particular detector 23, 24. Detectors 23, 24 then convert these magnetic signals into electric signals. Electric conductor 26 can optionally be provided in measuring gap M for producing a time-variant, magnetic signal.

Detectors 23 and 24 are preferably wired together so that each measuring head 20 produces only one electric signal. By inversely wiring detectors 23 and 24 one can simultaneously minimize external magnetic influences acting on pole shoes 21 and 22 since the electric signals from detectors 23 and 24 substantially cancel each other out in case of inverse wiring.

If required, the electric signals from detectors 23 and 24 can also be conducted out of measuring head 20 separately. For further processing, the signals can then optionally be amplified with separate amplifiers and further processed separately.

As shown in FIGS. 1*a* and 1*c,* a plurality of magnetic heads can be disposed as an array, the measuring gaps of the individual measuring heads being aligned parallel to each other. Such an arrangement permits a plurality of tracks of sheet material 10 to be measured simultaneously. For producing the time-invariant magnetic field one can use a single accordingly dimensioned permanent magnet 25.

Figure 2:
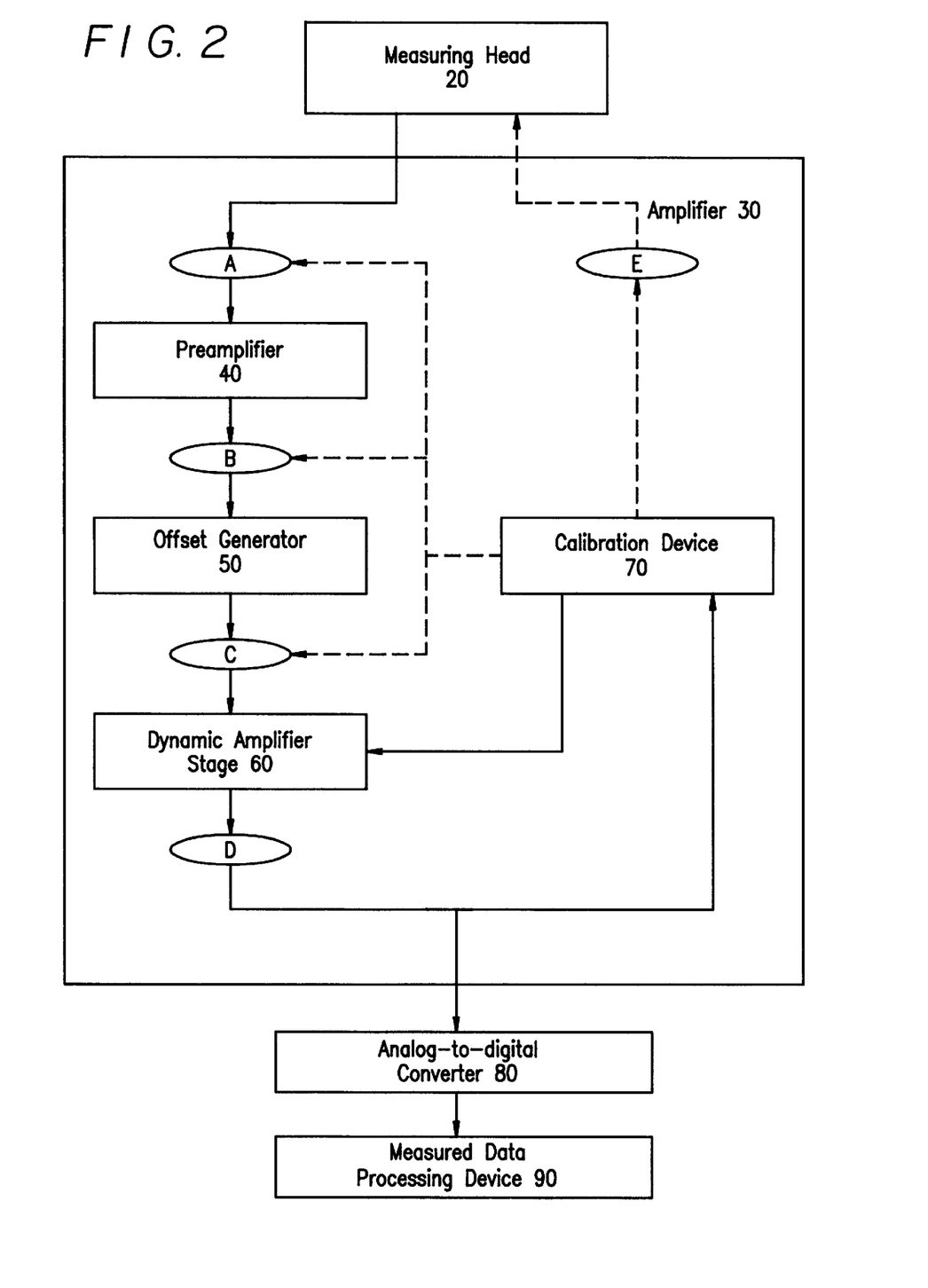
FIG. 2 shows a schematic view of an inventive apparatus.

FIG. 2 shows a schematic view of an inventive apparatus. Along with measuring head 20, which can either be executed according to the prior art or preferably as described above, the apparatus additionally has amplifier 30 for amplifying the electric signals from measuring head 20. Amplifier 30 has preamplifier 40, offset generator 50, dynamic amplifier stage 60 and calibration device 70.

For measurement of the magnetic properties of the sheet material, the magnetic properties of the sheet material are first detected at the measuring gap of measuring head 20 and then converted into electric signals of a certain signal range by detectors 23, 24 of measuring head 20. These electric signals then pass at point A into amplifier 30. There, the electric signals are generally first amplified uniformly by preamplifier 40. The electric signal produced by preamplifier 40 at point B is preferably shifted by a constant value by means of offset generator 50 and can thus be adapted to the response curve of following dynamic amplifier stage 60.

Figure 3:
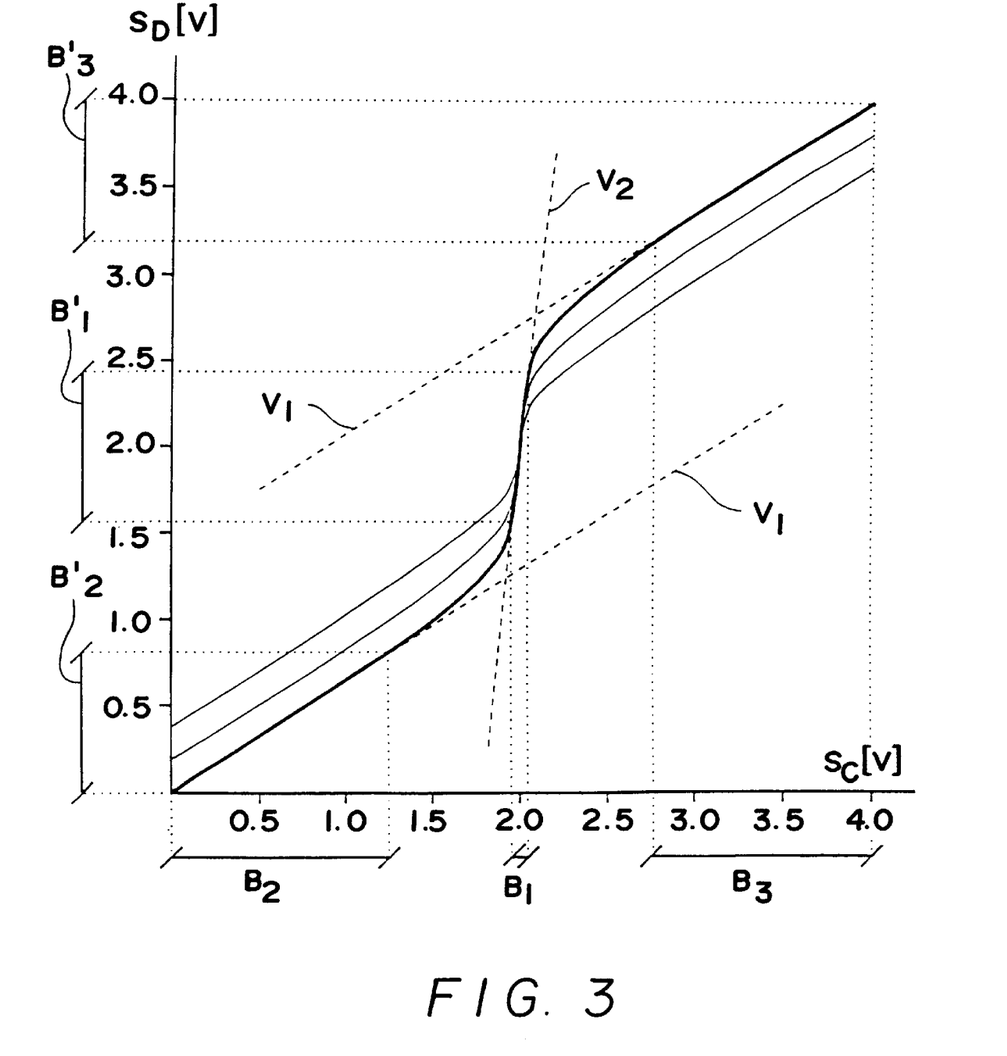
FIG. 3 shows a response curve of the amplifier stage.

The response curve of dynamic amplifier stage 60 is shown in FIG. 3. The x-axis shows the strength of electric signals $S_C$ at point C. The y-axis shows the strength of electric signals $S_D$ after dynamic amplifier stage 60 at point D.

The signal range preferably has three ranges $B_1$, $B_2$ and $B_3$ with constant amplification $V_1$ or $V_2$. In two outer ranges $B_2$ and $B_3$ the amplification is equal, $V_1$ here. In middle range $B_1$ amplification $V_2$ is greater than amplification $V_1$ in outer ranges $B_2$ and $B_3$.

If required, the signal range can also be divided into more than three ranges. The amplifications are selected to be equal in symmetrical ranges, i.e. the amplification is equal in the two outermost ranges, in the two ranges second from the outside, etc., while the amplification in the outermost range can be different from that in the second range from the outside for example. If there is an odd number of ranges the amplification of the middle range can be selected freely.

The special response curve of dynamic amplifier stage 60 ensures that low-amplitude electric signals are amplified to a great extent in middle range $B_1$ of the signal range, while the high-amplitude electric signals are amplified to a lesser extent, or even attenuated if required, in two outer ranges $B_2$ and $B_3$ of the signal range.

Figure 4A:
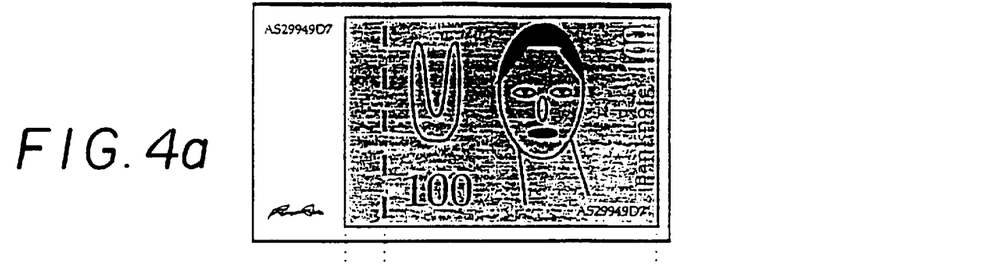
FIGS. 4a, 4b and 4c show schematic views of the amplified electric signals.
Figure 4B:
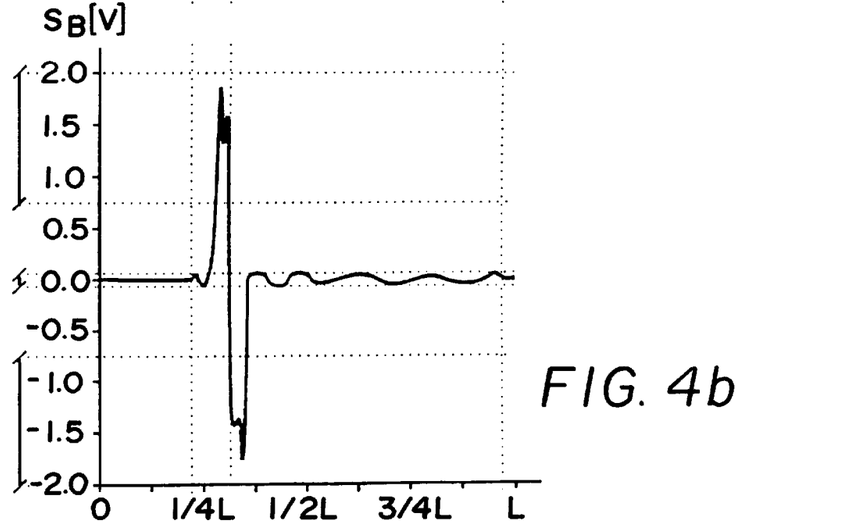

FIG. 4 shows schematically the amplified electric signals of a measurement of sheet material. FIG. 4*a* shows as sheet material, by way of example, a bank note which has low magnetic particle density in the area of the printed image shown in gray, while magnetic particle density is high in the area of the security thread shown by the dashed line. FIG. 4*b* shows the electric signal produced by the bank note at point B of amplifier 30 over length L of the bank note. The electric signal generally shows both positive and negative amplitudes. In the area of the printed image the amplitudes are very low, while being very high in the area of the security thread. The ratio between high and low amplitudes can in reality be much less favorable than the ratio shown here for reasons of clarity.

Figure 4C:
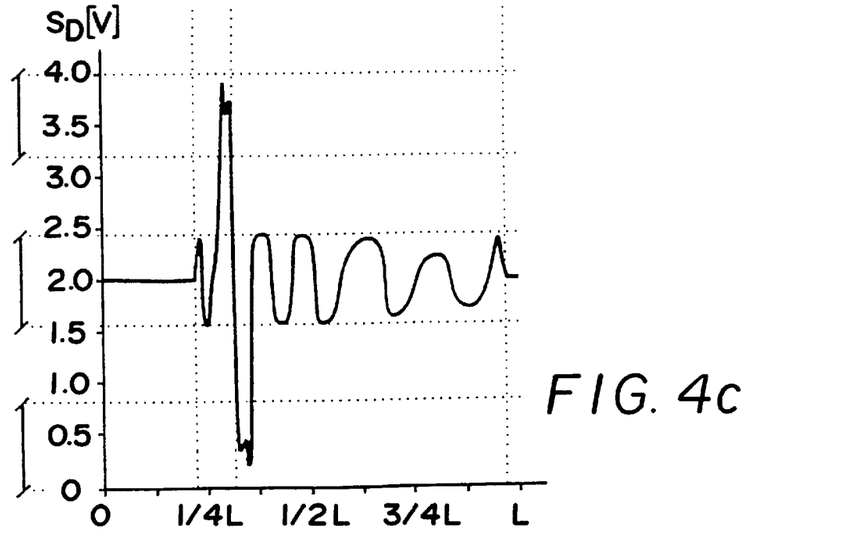

Electric signal $S_B$ at point B is first shifted by two units to positive values by offset generator 50 so that the zero point of the signal range is in the middle of middle range $B_1$ of dynamic amplifier stage 60. Resulting signal $S_C$ at point C is then amplified by dynamic amplifier stage 60 with the response curve shown in FIG. 3. Now resulting electric signal $S_D$ at point D is shown in FIG. 4*c*. The amplitude of electric signal $S_D$ at point D of amplifier 30 is therefore distributed much more uniformly over the output range of the amplifier than electric signal $S_B$ at point B and the signal pattern is more clearly recognizable.

Electric signal $S_D$ at point D can now be optimally processed by analog-to-digital converter 80 for example. In the case of 8-bit analog-to-digital converter 80 for example the digital output values are distributed substantially over the entire range of values between 0 and 255. Direct conversion of electric signal $S_C$ at point C would deliver substantially only a mean value and the extreme values 0 and 255. Information about the pattern of electric signal $S_C$ would be lost in such a conversion.

The digital output values produced by analog-to-digital converter 80 can then be conveyed for example to measured data processing device 90 which then for example compares the received digital values with stored digital values for testing the sheet material.

Figure 5A:
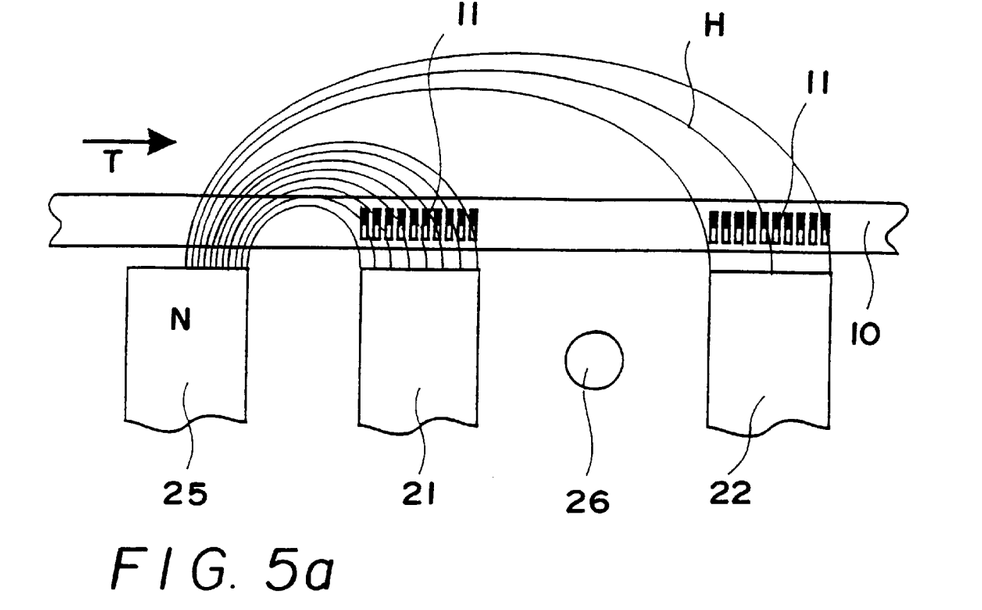
FIGS. 5a and 5b show schematic diagrams of a measurement of hard magnetic or soft magnetic particles.
Figure 5B:
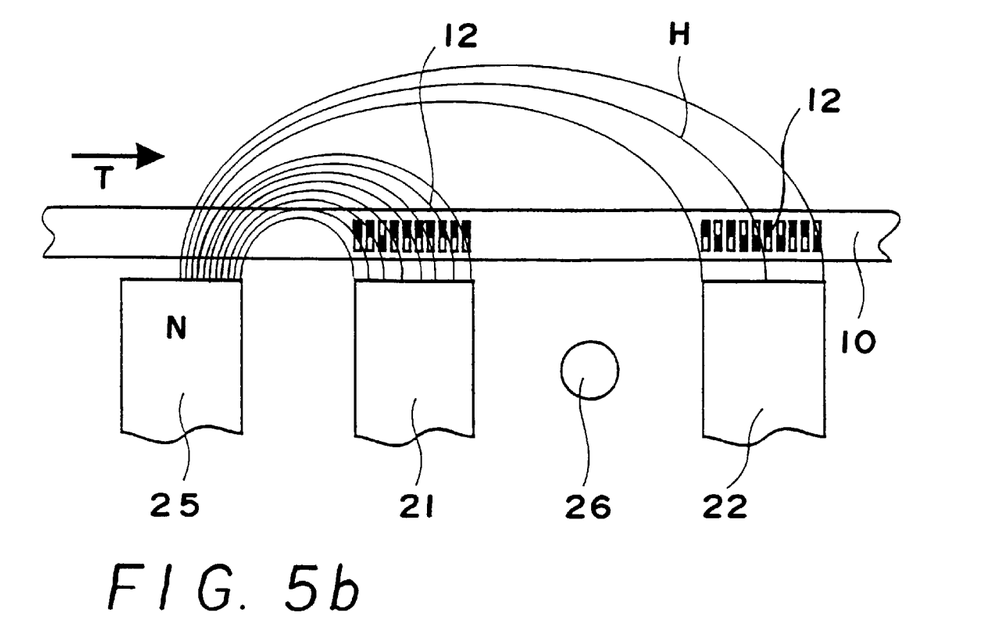

Measuring head 20 according to the preferred embodiment of the apparatus additionally makes it possible to ascertain with reference to the symmetry of electric signals $S_D$ at point D of the amplifier whether the measurement involves soft magnetic or hard magnetic particles. FIG. 5 is a section enlargement of FIG. 1b and shows schematically the measurement of soft magnetic or hard magnetic particles.

In FIG. 5a sheet material 10 contains hard magnetic particles 11. Hard magnetic particles 11 are all magnetized with the south pole shown in white in the direction of pole shoes 21 and 22. The hard magnetic particles can be magnetized for example before measurement by a strong permanent magnet not shown here or by permanent magnet 25.

The course of magnetic field H is further shown schematically. The strength of magnetic field H is proportional to the density of the lines shown. The strength of magnetic field H is therefore highest at permanent magnet 25. In the area of pole shoe 21 the strength of magnetic field H is just great enough for pole shoe 21 to have a suitable magnetic operating point, as described above. In the area of pole shoe 22 the strength of the magnetic field is much lower. However, the magnetization of the hard magnetic particles is substantially unaffected by the local strength of magnetic field H in the area of pole shoes 21 and 22.

FIG. 5b shows the measurement of soft magnetic particles. However, the magnetization of soft magnetic particles 12 depends on the local strength of magnetic field H. In the area of pole shoe 21 the magnetization of the soft magnetic particles is strong due to the presence of relatively strong magnetic field H, while the magnetization of soft magnetic particles 12 disappears almost completely in the area of pole shoe 22 since magnetic field H has much lower strength there.

Figure 6A:
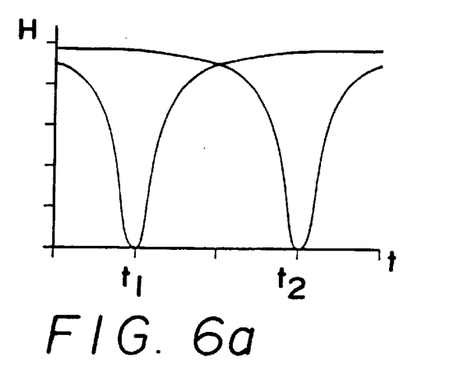
FIGS. 6a, 6b and 6c show schematic views of the signal symmetry of a hard magnetic area.

FIG. 6 schematically shows the signal symmetry of the electric signals arising at detectors 23 and 24, as is produced by a narrow area with hard magnetic particles when sheet material 10 is transported past. FIG. 6a plots the strength of magnetic field H over time. At time $t_1$ the hard magnetic area is located above pole shoe 21 and since it is magnetized oppositely to magnetic field H magnetic field H is attenuated. At time $t_2$ this process takes place in detector 24 of pole shoe 22.

Figure 6B:
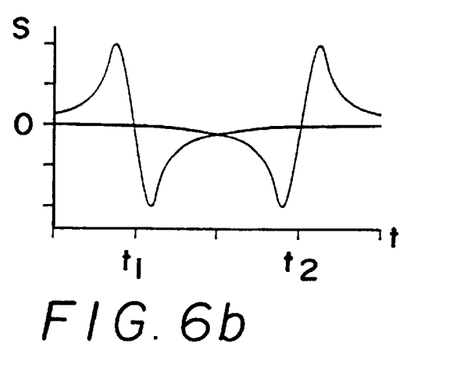

Since the magnetization of the hard magnetic area is constant during the entire time an equally great electric signal should be produced at detectors 23, 24 at equal permeability $\mu$ in pole shoes 21 and 22, as shown in FIG. 6b. The amplitude of electric signal S is proportional to the temporal variation of the magnetic field ($S \sim \mu$ dH/dt). With the signals from detectors 23 and 24 as shown in FIG. 6b the electric signal from detector 23 is additionally inverted for the abovementioned reasons.

However, since permeability u depends on the strength of local magnetic field H ($\mu=\mu(H)$), permeability $\mu$ is different in pole shoes 21 and 22 due to the different local strength of magnetic field H. Only the material of pole shoe 21 has optimal permeability $\mu(H)$ and therefore an optimal operating point so that detector 23 produces an electric signal with high amplitude. The electric signal produced at detector 24 has a lower amplitude, as shown in FIG. 6c.

Figure 6C:
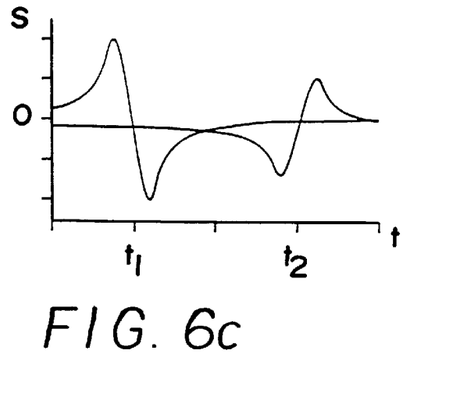
Figure 7A:
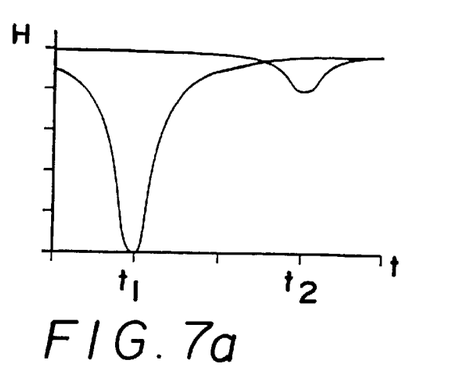
FIGS. 7a, 7b and 7c show schematic views of the signal symmetry of a soft magnetic area.
Figure 7B:
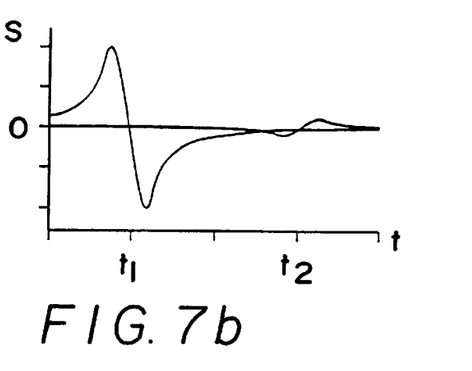

FIG. 7 shows the signal patterns analogous to FIG. 6 for a narrow area with soft magnetic particles. Since the magnetization of the soft magnetic area has already disappeared almost completely in the area of pole shoe 22, a much smaller change in magnetic field H results at time t2, as shown in FIG. 7a, and therefore also a much lower electric signal at detector 24 at equal permeability u in pole shoes 21 and 22, according to FIG. 7b.

Figure 7C:
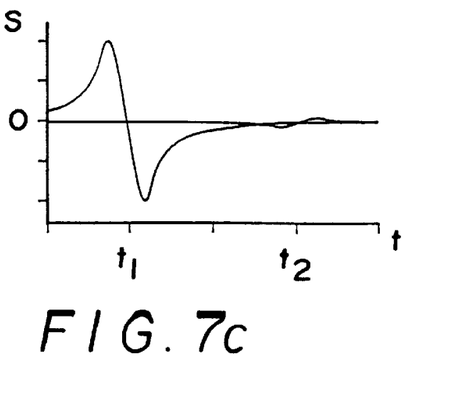

By reason of the abovementioned differences in permeability $\mu$ of the two pole shoes 21 and 22, the electric signal produced by detector 23 and shown in FIG. 7c disappears almost completely.

Comparing the signal patterns shown in FIGS. 6c and 7c, one sees that the hard magnetic area produces a much more symmetrical signal pattern than the soft magnetic area. This change in symmetry offers a possibility of distinguishing hard magnetic and soft magnetic areas independently of the intensity of the signal.

In order to ensure reproducible results for measurement of the sheet material, one should preferably avoid undesirable variations in amplification as caused e.g. by temperature influence or by wear of the measuring head. For this purpose one provides calibration device 70 in amplifier 30.

For calibration, calibration device 70 produces a defined electric signal which is injected in points A, B or C of the amplifier and amplified. Electric signal $S_D$ at point D is measured by calibration device 70 and compared with desired values stored in calibration device 70. This comparison is used to vary the amplification of dynamic amplifier stage 60 such that electric signals $S_D$ at point D as measured by calibration device 70 match the desired values stored in calibration device 70 and corresponding to the defined electric signals produced by calibration device 70.

Figure 8A:
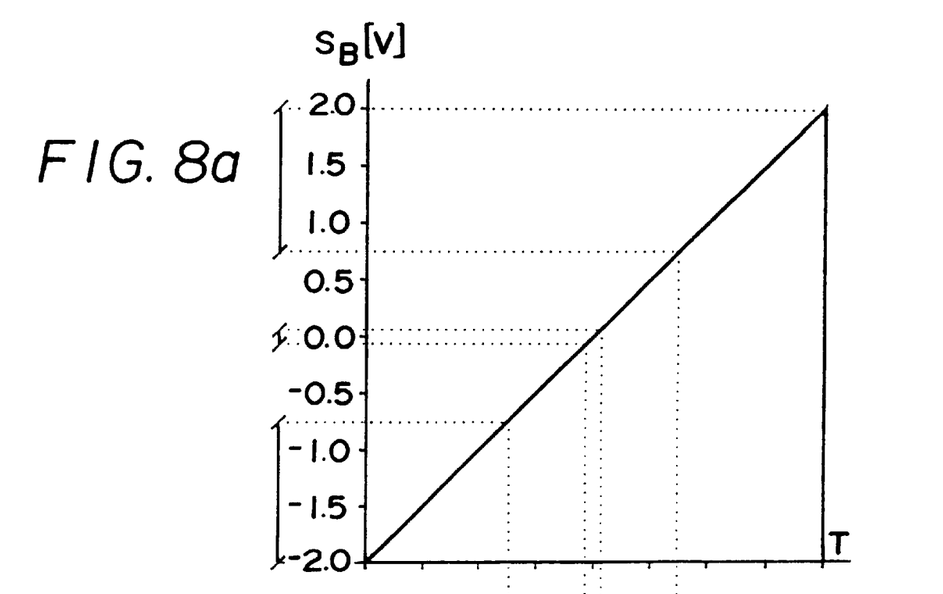
FIGS. 8a and 8b show schematic diagrams of the electric signals of a calibration device.
Figure 8B:
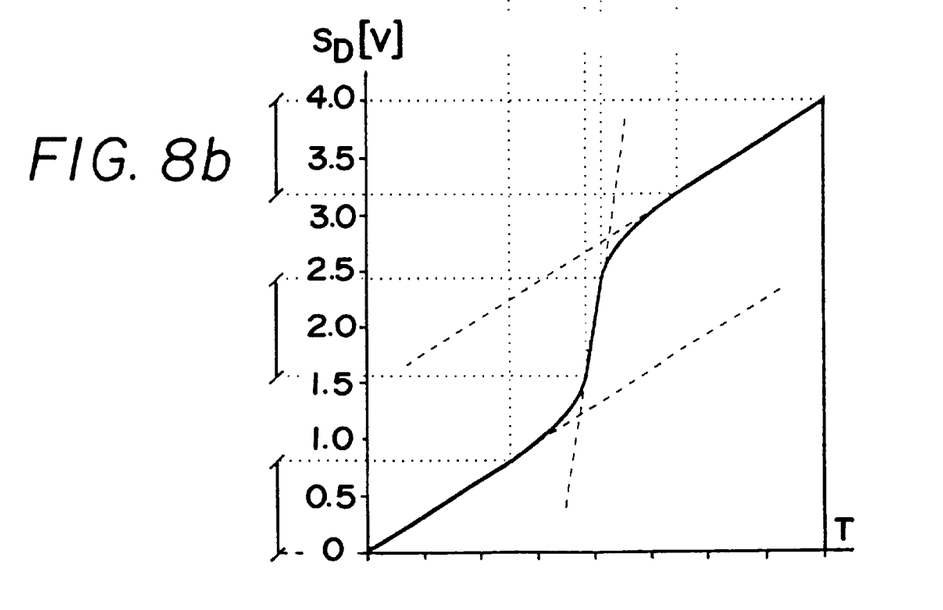

An exemplary signal pattern for a defined electric signal from calibration device 70 is shown in FIG. 8. Calibration device 70 preferably produces a time-variant, electric signal which covers the total signal range. An example of such a signal is shown in FIG. 8a over time. If this electric signal is injected at point B for example, calibration device 70 should measure at point D electric signal pattern $S_D$ shown in FIG. 8b. Corresponding deviations from the desired values can be compensated by the above-described variation of the amplification of amplifier stage 60.

It is of course also possible for calibration device 70 to vary the shift in offset generator 50 or the amplification in preamplifier 40 in case of need. The shape of the defined electric signal produced by calibration device 70 is shown as a sawtooth in FIG. 8a but can basically be selected at will.

Another possibility of calibration is for calibration device 70 to produce a defined, electric signal, as described above, and inject it for example into points A, B or C of amplifier 30. The digital signals amplified by amplifier 30 and converted by analog-to-digital converter 80 are then normalized to the expected digital desired values in measured data processing device 90. The necessary normalization constants can be calculated for example as the quotient of the expected digital desired values and the converted digital signals, and stored in corresponding tables of measured data processing device 90.

By injecting the electric signals produced by calibration device 70 at points A, B or C of amplifier 30 one merely eliminates undesirable variations in amplification. In order to additionally eliminate undesirable variations caused e.g. by wear of measuring head 20, calibration device 70 produces a defined, time-variant, electric signal which is conducted through electric conductor 26 in measuring gap M of measuring head 20. This electric signal causes a defined, magnetic signal to be produced in the measuring gap of measuring head 20. This electric signal can then be adapted to a given desired value either by corresponding variations in amplifier 30 or by normalization by measured data processing device 90, as described above.

What is claimed is:

1. A method for measuring magnetic properties of sheet material such as bank notes, wherein at least the following steps are performed:
converting the magnetic properties of the sheet material into electric signals of a certain signal range, and
amplifying the electric signals by
separating said electric signals of a certain signal range into electric signals of at least two signal ranges, and
amplifying the electric signals in said two signal ranges by constant amplification, the amplification being greater in a range for low-amplitude signals than in the adjoining signal range.

2. The method of claim 1, characterized in that said at least two signal ranges include at least three signal ranges of constant amplification, the amplification being greater in at least one signal range than in the adjoining signal ranges, and the electric signals being shifted by adding a DC offset voltage to the electric signals before amplification.

3. The method of claim 1, characterized in that at least the following steps are performed for calibrating a response curve of an amplifier, the calibration being carried out before conversion of the magnetic properties of the sheet material into electric signals of a certain signal range:
producing an electric calibration signal,
amplifying the electric calibration signal, and
varying the amplification of the electric calibration signal so that an output of said amplifier is adapted to a value of said certain signal range.

4. The method of claim 3, characterized in that the electric calibration signal is time-variant and covers the entire signal range.

5. The method of claim 1, characterized in that at least the following steps are performed for calibrating the response curve before conversion of the magnetic properties of the sheet material:
producing a certain magnetic signal (E),
converting the magnetic signal into an electric signal,
amplifying the electric signal, and
varying the amplification so that the electric signal (D) at the amplifier output is adapted to a certain value of the signal range.

6. The method of claim 5, characterized in that the magnetic signal is time-variant and the time-variant, electric signal produced by conversion covers the entire signal range.

7. The method of claim 3, characterized in that the variation of amplification is performed using tables.

8. An apparatus for carrying out the method of claim 1, having at least one magnetic sensor,
the magnetic sensor having at least one measuring head, with
at least one detector (23, 24), the detector converting magnetic signals perpendicular to the detector plane into electric signals, and
at least two pole shoes (21, 22) disposed so as to form a measuring gap and transfer magnetic signals at the measuring gap perpendicular to the detector plane of the detector (23, 24),
the magnetic sensor having at least one amplifier (30) for amplifying the electric signals from the detector (23, 24),
characterized in that
the pole shoes (21, 22) of the measuring head are magnetically decoupled,
each pole shoe (21, 22) has a detector (23, 24), and
the measuring head has means (25, 26) for producing a time-invariant magnetic field perpendicular to the detector plane of a detector (23), the strength of the magnetic field being different at each detector (23, 24) of the pole shoes.

9. The apparatus of claim 8, characterized in that the pole shoes have soft magnetic material.

10. The apparatus of claim 9, characterized in that the strength of the magnetic field is selected so that one pole shoe has a suitable magnetic operating point.

11. The apparatus of claim 8, characterized in that at least one pole shoe has a screen so that the strength of the magnetic field is as low as possible in this pole shoe.

12. The apparatus of claim 8, characterized in that the detectors (23, 24) are wired together so that the electric signals of the individual detectors (23, 24) are inverse.

13. The apparatus of claim 8, characterized in that the detectors (23, 24) each have at least one coil.

14. The apparatus of claim 8, characterized in that the detectors (23, 24) each have at least one Hall probe.

15. The apparatus of claim 8, characterized in that the detectors (23, 24) each have at least one magnetically sensitive resistor.

16. The apparatus of claim 8, characterized in that the means (25) for producing a time-invariant magnetic field have at least one permanent magnet.

17. The apparatus of claim 8, characterized in that the means (26) for producing a time-invariant magnetic field have at least one coil.

18. An apparatus for carrying out the method of claim 6, having at least one magnetic sensor (10), the magnetic sensor having
at least one detector (23,24) for converting magnetic signals perpendicular to the detector plane into electric signals,
at least one amplifier (30) for amplifying the electric signals from the detector (23,24), and
at least two pole shoes (21,22) disposed so as to form a measuring gap and transfer magnetic signals at the measuring gap perpendicular to the detector plane of the detector (23,24),
characterized in that
means (26) are provided in the measuring gap of the magnetic sensor for producing a magnetic calibration signal (E) for calibrating the response curve before conversion of the magnetic properties of the sheet material.

19. The apparatus of claim 18, characterized in that the means (26) have an electric conductor (71) and produce a time-variant, magnetic signal.

20. The apparatus of claim 19, characterized in that
the amplifier (30) has a calibration device (70) for producing an electric signal (E) which is conducted through the electric conductor (71), and
the calibration device (70) adapts the electric signal (D) measured at the amplifier output to a certain value by varying the amplification of the asmplifier (30).

21. The apparatus of claim 8, characterized in that a plurality of magnetic heads are disposed as an array, the measuring gaps of the individual measuring heads being aligned parallel to each other.

* * * * *